Dec. 15, 1970       R. L. BROWN, SR       3,548,214

CASCADED SOLID-STATE IMAGE AMPLIFIER PANELS

Filed Aug. 7, 1968                     2 Sheets-Sheet 1

INVENTOR
ROBERT L. BROWN, SR.

BY *Joseph H. Beumer*
*H. Mac Coy*

ATTORNEYS

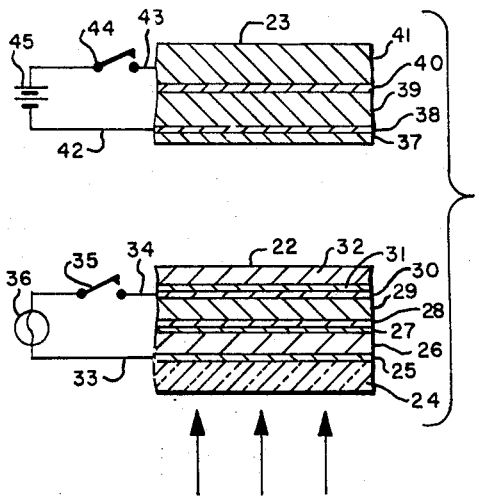
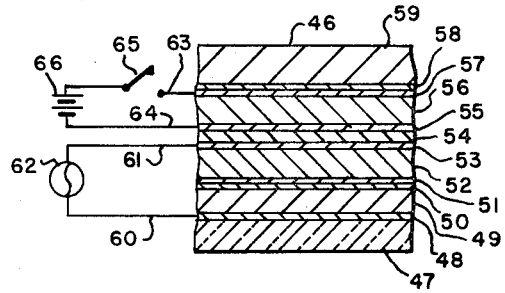
FIG. 3
FIG. 4
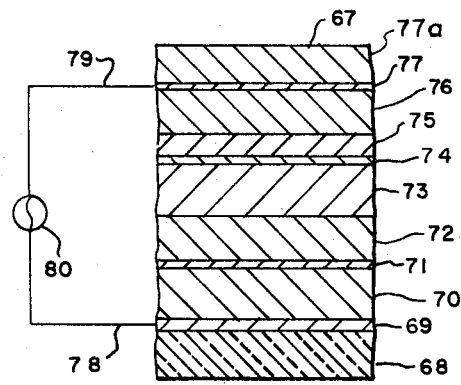
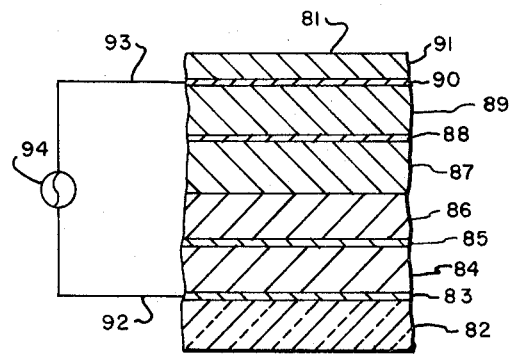
FIG. 5
FIG. 6

United States Patent Office 3,548,214
Patented Dec. 15, 1970

3,548,214
CASCADED SOLID-STATE IMAGE
AMPLIFIER PANELS
Robert L. Brown, Sr., 4805 Rutledge Drive NW.,
Huntsville, Ala. 35805
Filed Aug. 7, 1968, Ser. No. 750,853
Int. Cl. H01j 31/50
U.S. Cl. 250—213   15 Claims

ABSTRACT OF THE DISCLOSURE

A solid-state image amplifier panel structure having two or more image amplifier panel units placed in cascade. For X-ray image viewing applications the panel unit on the face exposed to the incident radiation includes, in order, a transparent electrode layer, a photoconductor layer, a vacuum deposited impedance-matching layer, an electroluminescent layer and a second transparent electrode layer and the output panel unit includes a transparent electrode, a layer containing a mixture of photoconductor and electroluminescent material and an outer transparent electrode. This embodiment exhibits high sensitivity and produces a high quality image with a long lifetime. Other embodiments provide very high gain and image integrating capabilities.

---

The invention described herein was made by an employee of the United States Government and may be manufactured and used by or for the Government of the United States of America for governmental purposes without the payment of any royalties thereon or therefor.

BACKGROUND OF THE INVENTION

This invention relates to solid-state image amplifiers and more particularly to solid-state image viewing and storage panels.

Solid-state image amplifiers, also known as image intensifiers, produce visible light images in response to an energizing source such as cathode rays, X-rays or other forms of radiant energy. In general these devices include a photoconductor such as cadmium sulfide or cadmium selenide and an electroluminescent material such as zinc sulfide disposed in a single layer or separate layers between transparent electrodes in a panel structure, with an electrical field being applied through the electrodes to the active layers. Input energy activates the photoconductor, producing an electrical current, and the current is amplified by the electrical field. The amplified current in turn activates the electroluminescent material to produce a light image. Upon removal of the electrical field or, with some constructions, reversing the polarity thereof the image is erased, allowing re-use of the panel. Numerous applications exist for devices of this type, but their use has been limited by the operating characteristics of the devices presently available.

One application for which improved solid state amplifier panels are particularly needed is in the field of X-ray image panels. Development of a panel with suitable amplifications and storage characteristics would allow viewing and study of X-ray images after the X-ray source has been turned off. For this purpose the panel should be responsive to low levels of radiation and it should provide for rapid buildup of the image to optimum quality so as to minimize radiation dosages. A high quality image with good resolution and high contrast is required for most X-ray work, and practical use of the panel would be facilitated by an image brightness sufficiently high to allow near-daylight viewing. The lifetime of the image after exposure should be long enough to allow meaningful reading and interpretation without the necessity of using photographic film. For economical use of solid-state image amplifiers for this purpose the panels should be capable of fabrication by relatively simple methods and techniques.

Various types of solid-state image amplifiers have been proposed for X-ray image viewing, but none of the existing devices has shown the combined characteristics of high sensitivity, favorable image quality and long image lifetime. Double-layer panels using separated layers of photoconductor and electroluminescent materials have been developed, and some of these panels exhibit high sensitivity and reasonably good image quality. The image lifetime for such panels has been so short, however, that as a practical matter the image cannot be examined after turning off the radiation source. Attempts have been made to obtain storage capability for such panels by means such as the utilization of feedback light by providing layers of controlled opacity in the panel, but image lifetime has remained short. Another type of panel, a simple structure having a single active layer of phosphor embedded in a ceramic material between electrodes as described more fully in British Pat. No. 966,730, issued to Peter W. Ranby et al., exhibits a long image lifetime, but its sensitivity is low so that relatively high radiation dosage levels are required to produce an image, and its image quality is deficient in that contrast is inadequate. The combination of high sensitivity, good image quality and long image lifetime has not been obtained in any of these panels, largely because high sensitivity materials which have the ability to produce high quality images are lacking in image storage capability.

Similar problems and deficiencies exist with regard to the solid-state image amplifier panels available for other applications such as for viewing of cathode-ray images.

SUMMARY OF THE INVENTION

In accordance with the present invention two or more solid-state image amplifier panels are placed in cascade, each of the component panels being a complete functional image amplifier unit, so that the image output of one panel serves as input for the next. The panel unit which is exposed to the radiation source is constructed to produce high sensitivity, fast response and a fine-grain image output, these results being enhanced by use of a thin, impedance-matching layer deposited on the photoconductor layer therein. Succeeding panels in the structure can be conventional storage panels, additional high sensitivity panels for direct viewing applications or other types of panels as described below. The results obtained, particularly for storage panel applications, far exceed the performance of existing devices. For example, a two-stage panel structure employing a Ranby panel as the image output stage shows high sensitivity to radiation, with sharp images being obtained at low exposures such as 10 milliroentgen, as compared to the previous minimum recommended exposure of 350 milliroentgen for such panels. Image buildup is rapid, and an optimum quality image is produced within about 5 seconds. The resulting image shows high contrast and good resolution, and this high quality is maintained for a lifetime of at least 20 minutes so as to facilitate detailed examination. Image brightness is sufficient to allow viewing under very high ambient light conditions in most cases. All of these advantages are obtained in a simple "sandwich" construction made up of a stack of uniform, continuous layers which can be deposited by conventional methods and techniques.

It is, therefore, an object of this invention to provide a solid-state image amplifier panel structure having high sensitivity to radiation, consistent with favorable image quality and image storage ability.

Another object is to provide a solid-state image amplifier panel characterized by rapid image buildup and relatively long image lifetime.

Another object is to provide a solid-state image amplifier panel which produces a visible light image having high contrast and good resolution upon being exposed to X-rays.

Another object is to provide a cascaded solid-state image amplifier panel structure having high gain characteristics.

Still another object is to provide a cascade solid-state image amplifier panel of simple and relatively inexpensive construction.

Other objects and advantages of the invention will be apparent from the following detailed description and the accompanying drawings.

BRIEF DESCRIPTION OF THE DRAWINGS

FIG. 3 is an enlarged view of a portion of an embodiment similar to FIG. 2 except that the two panel stage components are separate structures;

FIG. 4 is an enlarged sectional view of a portion of an embodiment similar to FIG. 2 except that an additional insulating layer is provided;

FIG. 5 is an enlarged sectional view of a portion of a high gain amplifier panel with low storage capability; and FIG. 6 is an enlarged sectional view of a high-gain light-integrating panel structure.

DESCRIPTION OF THE PREFERRED EMBODIMENT

Figure 1:
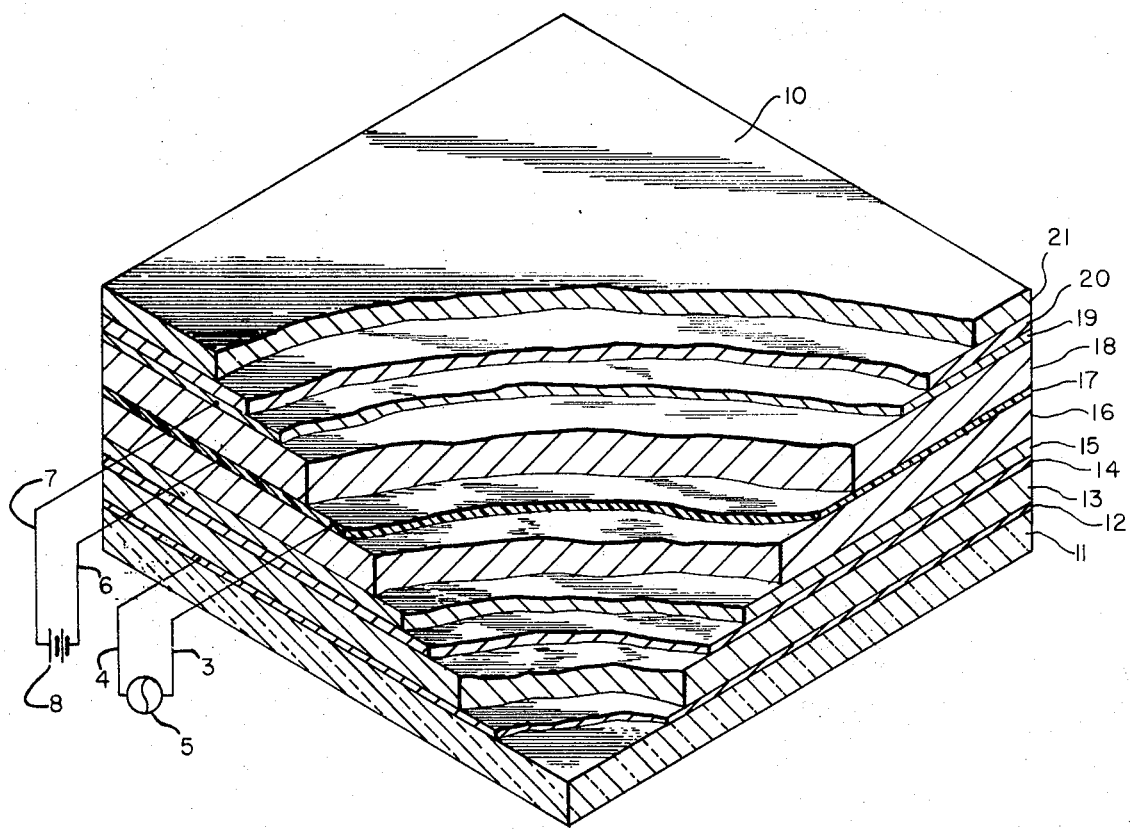
FIG. 1 is a perspective view of a cascade solid-state image amplifier panel embodying the invention, with thicknesses exaggerated for the purpose of clarity and with electrical components shown schematically.
Figure 2:
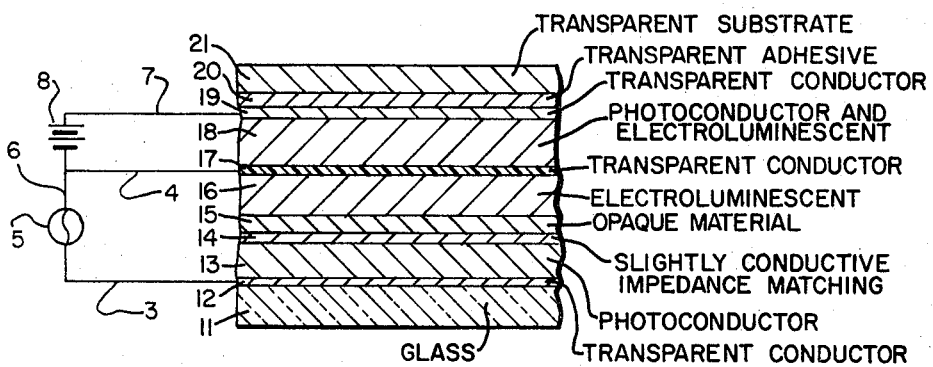
FIG. 2 is an enlarged sectional view of a portion of the structure of FIG. 1.

Referring now to FIG. 1 and FIG. 2, there is shown a cascade panel structure generally designated by numeral 10. The outermost layer 11, on the face of the panel which is exposed to the incident radiation, is a protective material, normally glass or clear plastic, which is transparent to the incident radiation. Layer 11 is in contact with a thin, continuous layer 12 of material such as tin oxide which is electrically conductive, but transparent to the incident radiation. Adjacent to conductive layer 12 and in continuous electrical contact therewith is a layer 13 of photoconductor material such as cadmium sulfide or cadmium selenide activated with traces of copper, silver or the like, which material produces electrical current varying in response to the incident radiation.

Layer 13 is coated with a thin layer 14 of slightly conductive material selected to provide matching impedance with electroluminescent layer 16. The impedance-matching layer 14 can be a very thin, for example, 2 to 5 microns, coating of cadmium selenide applied by vacuum deposition. Layer 14 is in contact with a thin layer 15 of opaque material which prevents the feedback to layer 13 of light produced by electroluminescent output layers. Layer 15 can be a black-colored film of plastic such as pigmented polyvinyl chloride. Layer 15 can be omitted in high-sensitivity panels employing a cadmium selenide photoconductor, but its presence is beneficial for most applications. Layer 15 is in contact with a layer 16 of electroluminescent material such as zinc sulfide or a light-emitting semi-conducting junction which emits visible light in response to the electrical current produced by the incident radiation in layer 13. Layer 16 on its output face is coated with a thin film 17 of substantially transparent, electrically conductive material such as gold, platinum or the like.

Layer 18 in contact with electrode layer 17 contains both a photoconductor material and electroluminescent material, for example, a mixture of activated cadmium sulfide and zinc sulfide embedded in a suitable ceramic, and output visual image is produced in this layer. Layer 19 in contact with layer 18 is a transparent electrically conductive film similar to layer 17. Layer 19 is covered with a film 20 of transparent adhesive and an outer protective layer 21 of glass or clear plastic. Conducting layers 12 and 17 are connected by leads 4 and 3, respectively, to an alternating-current source 5 to provide an AC electrical field across layers 13 through 16. Layers 17 and 19 are connected by leads 26 and 27 to a direct-current source 8 to provide a DC electrical field across layer 18.

In the embodiment depicted in FIG. 1 layers 11 through 17 correspond to the structure of previously known double-layer image amplifiers with the impedance matching layer 14 contributing to the high resolution needed for cascading. Layers 17 through 21 correspond to the structure of a previously known single-layer storage-type amplifier panel. These two panel units are cascaded in series with conductive layer 17 common to the two units.

In operation of the embodiment described above, the panel structure 10 is placed in the path of radiant energy such as X-rays or visible light emerging from a test object in a manner such that the input energy enters and penetrates layer 11. Electrical current responsive to the incident radiation is produced by reaction of the radiation with photoconductor material in layer 13 under the influence of the electrical field produced by supplying current to electrode layers 12 and 17. The radiation-produced current passes through impedance-matching layer 14 and opaque layer 15 into electroluminescent layer 16 where it produces a light image by capacitive action or by reaction with the electroluminescent material. This emerging light image passes through transparent electrode layer 17 and into layer 18 where it is converted to an electrical current by reaction with photoconductor material and the resulting current is again converted to a visual image by reaction with electroluminescent material under the influence of the electrical field supplied through electrodes 17 and 19. The image produced in layer 18 can then be viewed through transparent outer layers 20 and 21.

Passage of the light output from the first panel unit through the second, single-layer panel produces a completely unexpected improvement in image characteristics. The image is improved in overall quality and vastly improved with regard to sensitivity and storage characteristics. Some resolution is lost as a result of cascading, but the resolution obtained, at least 150 lines per inch under typical conditions, is still excellent for a panel having storage capability.

The materials used in the various layers of the embodiment described above and the methods employed in depositing them can be generally the same as have been used for such layers in previously known panel structures. Layer 11 as indicated above can be glass or a clear plastic such as methyl methylacrylate. The thickness of this layer is not critical, but about 0.01 to 0.02 inch is usually employed. Layer 12 can be any electrically conductive material transparent to the incident radiation, and tin oxide is preferred where the substrate is glass. Other transparent materials such as evaporated metal films or carbon films can be used. Tin oxide can be deposited by spraying a thin layer of tin chloride and heating in air to convert it to tin oxide. A typical tin oxide layer thickness is 0.0001 to 0.001 inch.

The photoconductor material in layer 13 can be any photoconductor such as cadmium selenide or cadmium sulfide activated with a small amount, typically 2 to 5 percent, of copper, gold or other suitable metal. Cadmium selenide is preferred for applications requiring a more rapid response. This layer can be applied by spraying or settling of a water solution or by electrophoresis, followed by sintering at an elevated temperature under an inert atmosphere, with 500° C. under nitrogen being suitable conditions. The photoconductor layer thickness is usually about 0.001 to 0.0025 inch, although much thinner layers, down to a few microns, can be used in special cases for light-sensitive panels. Layer 14, a thin film of slightly conductive material having a bulk resistivity of approximately $10^{-7}$ to $10^{-11}$ ohms per cubic centimeter, is applied to layer 13 to provide impedance matching with respect to electroluminescent layer 16. Layer 14 can be intrinsic cadmium sulfide or cadmium selenide applied by vacuum deposition to a thickness such as 2 to 5 microns. The vacuum-deposited film improves resolution of the panel and provides a fine-grained image output.

Layer 15, which prevents feedback of light to the photoconductor layers, can be a thin film of black-pigmented plastic, evaporated silicon monoxide or other material substantially opaque to the response peak of the photoresist layer. The usual thickness of this layer is about 0.0005 inch, although it can vary from about 0.001 to a few millionths of an inch depending on the material used. As indicated above, this layer can be omitted in high-sensitivity panels where the panel is to be viewed in dim light. Electroluminescent layer 16 can be a suspension of a phosphor such as zinc sulfide activated with a small amount, for example, 2 to 5 percent, of a metal such as copper in a plastic medium, with polyvinyl chloride being suitable for this purpose. This layer can be applied by spraying of the plastic containing suspension and curing by heating, for example, to 100 to 200° C. for polyvinyl chloride. The electroluminescent layer is usually 0.001 to 0.003 inch thick. Thicker layers provide a higher gain and a brighter image, but with less resolution, since there is more room for image "spread" in thick panels. Electrode layer 17 can be the same as electrode layer 12 described above, and is preferably a thin film of evaporated gold, platinum or the like.

Layer 18 contains both a photoconductor and electroluminescent material, with a mixture of activated zinc sulfide and cadmium sulfide being suitable as the active material. The mixture is preferably embedded in a plastic in the manner described for the electroluminescent layer. Layer 18 can also be made up of a mixture of activated zinc sulfide and cadmium sulfide embedded in a ceramic or enamel as described in the British Patent to Ranby et al. referred to above. Single-layer panels made according to the Ranby patent can be bonded to a layered structure comprising layers 11 through 17 by etching away the back iron electrode layer and enamel glaze of the Ranby structure with acid to expose the active layer 18 and replacing the iron electrode layer with electrode layer 17. This technique can be used to fabricate cascaded storage panels using existing Ranby panels while avoiding subjecting the entire assembly to the high-temperature firing step required for the ceramic or enamel component. Layer 18 is typically about 0.001 inch thick. Layer 19 is another electrode layer essentially the same as layer 17. Layers 20 and 21 are a transparent adhesive and transparent protective cover, respectively. These layers can be combined by using a clear plastic having adhesive qualities as the outer layer.

In operation of the preferred panel embodiment a DC voltage is applied to electrode layers 17 and 19, with a variable voltage DC supply adjustable between the limits of 40 to 140 volts being suitable. An AC voltage is preferably applied across electrode layers 12 and 17 to activate the first panel stage, although such panel stages can be designed to operate with DC voltage. For AC operation a variable supply adjustable between 40 and 140 volts is normally used, although some panels can operate at voltages as high as 600 to 1000.

FIG. 3 shows an embodiment wherein two panel units 22 and 23 are separate structures cascaded in the path of the incident radiation, indicated by arrows. The distance between panel units is exaggerated for clarity in this view; in operation the bottom layer unit 23 is in face-to-face contact with the top layer of unit 22. The structure of unit 22 corresponds functionally to layers 11 through 17 of the embodiment shown in FIG. 1 and FIG. 2. Thus, layer 24 on the face which is exposed to the incident radiation is a transparent protective layer; layer 25 is an electrically conductive material transparent to the incident radiation; layer 26 contains active photoconductor material; layer 27 is an impedance-matching layer of slightly conductive material applied by vacuum deposition; layer 28 is opaque material; layer 29 is electroluminescent material; and layer 30 is a transparent, electrically conductive film. Transparent adhesive layer 31 and outer transparent protective layer 32, which can be a single layer as described above, are provided above electrode layer 30. An alternating current voltage is supplied to electrode layers 25 and 30 through leads 33 and 34 and switching device 35 from AC source 36. Panel unit 23 is a complete storage panel made up according to the Ranby patent. Layer 37 is a transparent protective material; layer 38 is a transparent electrically conductive film; layer 39 is a mixture of photoconductor and electroluminescent material embedded in ceramic or enamel material; layer 40 is an enamel glaze; and layer 41 is an iron substrate. A direct current voltage is applied to layers 38 and 41 through leads 42 and 43 through switching device 44 from DC source 45. The composition of the respective layers in this embodiment is the same as for the corresponding layers in the embodiment of FIG. 1 and FIG. 2 except that the storage panel unit 23 has an iron substrate 41 and enamel glass layer 40 which are removed in the integral structure of FIGS. 1 and 2.

In operation of the embodiment shown in FIG. 3, the storage panel unit 23 must be removed from input panel 22 in order to view the image inasmuch as iron substrate 41 is not transparent. Image quality is decreased somewhat in this embodiment owing to image spread in protective layers 32 and 36, but a good image is still obtained and this embodiment allows use of a Ranby-type panel without modification.

FIG. 4 shows an embodiment similar to the embodiment of FIGS. 1 and 2 except that an additional adhesive layer 54 is inserted between the output side of the first panel unit and the input side of the second unit. This also necessitates the privosion of an additional electrically conductive layer to serve as the input-side electrode for the second unit. In FIG. 4, 47 is a transparent protective layer; 48 is an electrically conductive layer transparent to the incident radiation; 49 is a layer of photoconductive material; 50 is an impedance-matching, thin layer of slightly conductive material; 51 is a thin layer of black plastic or other opaque material which prevents light feedback; 52 is a layer containing electroluminescent material; 53 is a transparent, electrically conductive layer; 54 is a layer of clear plastic or adhesive material; 55 is a transparent electrically conductive layer; 56 is a layer containing both a photoconductor and electroluminescent material; 57 is a transparent electrically conductive layer; 58 is a layer of adhesive and 59 is a transparent protective layer. Alternating current is supplied to layer 48 and 53 through leads 60 and 61 from AC source 62, and direct current is supplied to layers 55 and 57 through leads 63 and 64 and switching device 65 from DC source 66. This embodiment produces a brighter image by closer coupling of exciting light.

FIG. 5 shows an embodiment wherein two double-layer panels having impedance-matching layers are cascaded to produce a panel structure 67 having a very high gain factor but low storage capability. In this embodiment layer 68 is a transparent protective cover; layer 69 is transparent electrically conductive material; 70 is a layer of photoconductor material; 71 is an impedance-matching thin layer of slightly conductive material deposited by vacuum evaporation; 72 is a layer of electroluminescent material; 73 is a layer of photoconductor material; 74 is an impedance-matching thin layer of slightly conductive material; 75 is a layer of black plastic or other opaque material; 76 is a layer of electroluminescent material; 77 is a layer of transparent, electrically conductive material; and 77a is a transparent protective layer. An AC voltage is supplied to layers 69 and 77 through leads 78 and 79 from AC source 80. The composition of each of these layers can be the same as described for the corresponding layers in the embodiment of FIGS. 1 and 2. This embodiment provides a high-sensitivity panel for direct-viewing purposes since each of the two panel units has a high gain individually and the overall gain in the product of the individual gains. Storage capability can be obtained in this embodiment by employing in layer 75 a material of controlled opacity such as pigmented plastic so that enough light leaks past this layer to maintain an image, or a Ranby-type storage panel may be cascaded on the stack as previously described. Even higher gains can be obtained in this embodiment by cascading additional high-sensitivity panel units.

FIG. 6 shows a high-gain light-integrating panel embodiment. In this panel structure 81, layer 82 is a transparent protective cover; 83 is a transparent electrically conductive material; 84 is a layer containing a fast-response photoconductor such as activated cadmium selenide; 85 is an impedance-matching layer of slightly conductive material applied by vacuum evaporation; 86 is a layer of electroluminescent material; 87 is a layer of slow-response photoconductor material such as activated cadmium sudfide; 88 is a layer of material such as pigmented plastic having a predetermined opacity which will allow partial feedback of output light without blurring of the image; 89 is a layer of electroluminescent material; 90 is a transparent electrically conductive layer; and 91 is a transparent protective cover. An AC voltage is applied to layers 83 and 90 through leads 92 and 93 from AC source 94. In this embodiment the photoconductor material in the first panel unit has a fast response and a two or three second decay time. The second panel unit photoconductor has a slow response (about one minute) and it acts as an integrator of the output of the first stage electroluminescent layer. This embodiment can be used for integration and readout of pulsed images such as spaced flashes or traces on a cathode ray tube.

The embodiments shown in FIG. 5 and FIG. 6 can be modified to provide independent electrical control of each panel unit by disposing a transparent electrode layer between panel units, that is, between layers 72 and 73 in FIG. 5 and between layers 86 and 87 in FIG. 6. Each panel unit would then be connected to a separate current cource, with the inserted electrode layer common. This means can be used to supply alternating current having different frequencies to the respective panel units.

Various other cascaded panel structures are included within the scope of this invention. For example, two or more Ranby-type panels as described above can be stacked, after removal of the iron substrate layer on the back of the first panels so that the light output of each panel serves as input for the next. Such a structure provides for integration and storage of an image such as a cathode ray picture over a long period of time. These characteristics would be advantageous for applications such as a radar display screen where the "blip" positions would be integrated and displayed for several minutes. For most applications, however, it is necessary to use a high-sensitivity panel unit having an impedance matching slightly conductive layer as the first stage exposed to the incident radiation so as to obtain a high enough resolution that image quality is not lost in cascading.

Although the embodiments described above refer primarily to viewing and storage of X-ray and light images, it is to be understood that these panel structures can be used without modification for images of other types of electromagnetic or particle radiation. Such other forms of radiation include cathode rays, gamma rays, ultraviolet and infrared radiation and ionizing nuclear radiations. The only requirement in this regard is that the incident radiation will react with the photoconductor layer in the first panel stage or that an added reactive stage be added to drive the photoconductor layer.

The embodiment shown in FIGS. 1 and 2 are described above has characteristics which make this cascaded panel structure particularly attractive for medical X-ray applications. Its high sensitivity enables the use of very low levels of radiation, and the dosages required for a readable image are as much as a factor of 16 lower than most X-ray fluoroscopes in current use. In addition the image lifetime of at least 20 minutes allows detailed examination of the image without the use of film, if desired. The image can also be photographed for permanent storage where required. The other embodiments included in the invention also exhibit significant advantages for a variety of applications involving direct-viewing, storage and integrating of images.

It is to be understood that changes, variations, modifications and other uses and applications for the devices described above will be apparent to those skilled in the art after considering the specification and accompanying drawings, which are presented for illustrative purposes only. All such changes, variations, modifications and other uses which do not depart from the spirit and scope of this invention are deemed to be covered by the invention, which is limited only by the appended claims.

What is claimed is:

1. An image amplifier panel structure comprising at least two individual amplifier panels placed in face-to-face contact so that the output light image of each of said individual panels serves as the input image for the succeeding panel in contact therewith, each of said individual panels having photoconductor material and electroluminescent material disposed between transparent electrode layers, the first individual panel on the face of the structure to be exposed to an incident image having a first active layer containing photoconductor material dispersed throughout, a second active layer containing electroluminescent material dispersed throughout and a layer of slightly conductive material deposited on the output face of said first active layer, the impedance of said slightly conductive material matching the impedance of said second active layer, said first individual panel including means for applying an alternating current voltage across said active layers.

2. An image amplifier panel structure comprising a first image amplifier having a group of layers in face-to-face, continuous contact in the following order: a first electrically conductive layer transparent to incident radiation, a layer containing photoconductor material dispersed uniformly throughout, a thin layer of slightly conductive material deposited on said dispersed layer of photoconductive material, a layer having electroluminescent material dispersed throughout, the impedance of said slightly conductive material matching the impedance of said layer having electroluminescent material dispersed throughout, and a second transparent electrically conductive layer and a second image amplifier in face-to-face contact with said first image amplifier, said second image amplifier comprising a group of layers in face-to-face continuous contact in the following order: a first transparent electrically conductive layer, a layer containing a mixture of photoconductor and electroluminescent materials dispersed throughout and a second electrically conductive layer, means for applying an alternating current voltage between said conductive layers in said first image amplifier and means for applying a direct-current voltage between said conductive layers in said second image amplifier.

3. The panel structure of claim 2 including a layer of light-opaque material disposed between said layer of slightly conductive material and said electroluminescent layer in said first image amplifier.

4. The panel structure of claim 2 having said second conductive layer in said first image amplifier and said first conductive layer in said second amplifier common and wherein said second conductive layer in second image amplifier is transparent.

5. The panel structure of claim 3 wherein said layer containing a mixture of photoconductor and electroluminescent materials comprises a dispersion of said materials in a ceramic material.

6. The panel structure of claim 2 wherein said layer of slightly conductive material is cadmium selenide applied by vacuum deposition.

7. An image amplifier structure comprising a first image amplifier having a group of layers in face-to-face, continuous contact in the following order: an electrically conductive layer transparent to incident radiation, a layer containing photoconductor material dispersed throughout, a thin layer of slightly conductive material deposited on said dispersed layer of photoconductor material and a layer having electroluminescent material dispersed throughout, the impedance of said slightly conductive material matching the impedance of said layer having electroluminescent material dispersed throughout, and a second image amplifier in face-to-face contact with said first image amplifier and comprising a group of layers in face-to-face continuous contact in the following order: a layer containing photoconductor material dispersed throughout, a thin layer of slightly conductive material deposited on said dispersed layer of photoconductor material, a layer having electroluminescent material dispersed throughout, the impedance of said slightly conductive material matching the impedance of said layer having electroluminescent material dispersed throughout, and a transparent electrically conductive layer and means for applying an alternating-current voltage between said electrically conductive layers.

8. The panel structure of claim 7 wherein said layers of slightly conductive material in each of said image amplifiers is cadmium selenide deposited by vacuum evaporation.

9. The panel structure of claim 8 wherein said dispersed photoconductor material in said first and second amplifiers is activated cadmium selenide.

10. The panel structure of claim 7 including a layer of opaque material between said layer of slightly conductive material and said electroluminescent layer in said second amplifier.

11. The panel structure of claim 7 including a transparent, electrically conductive layer disposed between said first image amplifier and said second image amplifier.

12. An image amplifier structure comprising a first image amplifier having a group of layers in face-to-face, continuous contact in the following order: an electrically conductive layer transparent to incident radiation, a layer containing photoconductor material dispersed throughout, a thin layer of slightly conductive material deposited on said dispersed layer of photoconductor material and a layer having electroluminescent material dispersed throughout, the impedance of said slightly conductive material matching the impedance of said layer having electroluminescent material dispersed throughout, and a second image amplifier in face-to-face contact with said first image amplifier and comprising a group of layers in face-to-face, continuous contact in the following order: a layer containing photoconductor material dispersed throughout, a layer of material having a predetermined opacity such as to allow partial feedback of light, a layer having electroluminesecnt material dispersed throughout, and a transparent electrically conductive layer and means for applying an alternating-current voltage between said electrically conductive layers.

13. The panel structure of claim 12 wherein said photoconductor material in said first amplifier is a fast-response photoconductor and said photoconductor material in said second amplifier is a slow-response photoconductor.

14. The panel structure of claim 13 wherein said fast-response photoconductor is activated cadmium selenide and said slow-response photoconductor is activated cadmium sulfide.

15. The panel structure of claim 12 including a transparent, electrically conductive layer between said first image amplifier and said second image amplifier.

References Cited

UNITED STATES PATENTS

| | | | |
|---|---|---|---|
| 2,837,660 | 6/1958 | Orthuber et al. | 250—213 |
| 3,058,002 | 10/1962 | Sihoyonen | 250—213X |
| 3,210,551 | 10/1965 | Vaughn et al. | 250—213 |
| 3,344,280 | 9/1967 | Martol | 250—213 |
| 3,204,106 | 8/1965 | Murr et al. | 250—213 |

JAMES W. LAWRENCE, Primary Examiner

C. M. LEEDOM, Assistant Examiner

U.S. Cl. X.R.

250—83.3; 313—108